(12) United States Patent
Bardon

(10) Patent No.: US 7,503,955 B2
(45) Date of Patent: Mar. 17, 2009

(54) BLOCK FOR THE FILTRATION OF PARTICLES CONTAINED IN EXHAUST GASES FROM AN INTERNAL COMBUSTION ENGINE

(75) Inventor: Sébastien Bardon, Lyons (FR)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 429 days.

(21) Appl. No.: 10/564,410

(22) PCT Filed: Jul. 12, 2004

(86) PCT No.: PCT/FR2004/001829

§ 371 (c)(1),
(2), (4) Date: Jan. 13, 2006

(87) PCT Pub. No.: WO2005/008037

PCT Pub. Date: Jan. 27, 2005

(65) Prior Publication Data

US 2006/0191245 A1      Aug. 31, 2006

(30) Foreign Application Priority Data

Jul. 15, 2003   (FR) .................................. 03 08588

(51) Int. Cl.
*B01D 46/00* (2006.01)
*F01N 3/022* (2006.01)

(52) U.S. Cl. ....................... 55/523; 55/282.2; 55/282.3; 55/385.3; 55/482; 55/483; 55/484; 55/524; 55/DIG. 5; 55/DIG. 10; 55/DIG. 30; 95/273; 60/297; 60/299; 60/311; 428/116; 422/180

(58) Field of Classification Search ............... 55/282.2, 55/282.3, 385.3, 482, 483, 484, 523, 524, 55/DIG. 5, DIG. 10, DIG. 30; 95/273; 60/297, 60/299, 303, 311; 428/116, 117, 118; 422/177, 422/180; 502/439

See application file for complete search history.

(56) References Cited

U.S. PATENT DOCUMENTS

| 4,443,313 | A | * | 4/1984 | Gesing et al. ............... 204/240 |
| 5,009,857 | A | * | 4/1991 | Haerle .......................... 55/523 |
| 5,207,807 | A | * | 5/1993 | Manfre et al. ................. 55/523 |

(Continued)

FOREIGN PATENT DOCUMENTS

DE       299 12 194 U1 * 12/1999

(Continued)

OTHER PUBLICATIONS

Patent Abstracts of Japan vol. 0117, No. 117 (M-1378), & JP 04 301129 A (Matsushita Elecetric Ind Co Ltd), Oct. 23, 1992 abstract figures 1, 3.

*Primary Examiner*—Jason M Greene
(74) *Attorney, Agent, or Firm*—Young & Thompson

(57) ABSTRACT

A filter body (3) which is intended, in particular, for the filtration of particles contained in the exhaust gases from an internal combustion engine. The filter body (3) is formed by bonding filter blocks (11) using a joint (17). An outer surface (16) of the first of the blocks (11), which is disposed opposite the second of the blocks (11) and which is in contact with the joint (17), includes at least one projection- and/or cavity-type irregularity (30a, 30b).

19 Claims, 3 Drawing Sheets

U.S. PATENT DOCUMENTS

| | | | |
|---|---|---|---|
| 5,238,386 A * | 8/1993 | Cunningham et al. | 425/192 R |
| 5,290,330 A * | 3/1994 | Tepper et al. | 55/484 |
| 5,914,187 A * | 6/1999 | Naruse et al. | 55/523 |
| 6,942,712 B2 * | 9/2005 | Hamanaka et al. | 55/523 |
| 7,214,253 B2 * | 5/2007 | Bardon et al. | 55/523 |
| 2008/0014405 A1 * | 1/2008 | Sakamoto | 428/116 |

FOREIGN PATENT DOCUMENTS

| | | |
|---|---|---|
| EP | 0 816 065 | 1/1998 |
| EP | 1 142 619 | 10/2001 |
| WO | WO 94/21900 | 9/1994 |

* cited by examiner

PRIOR ART

BLOCK FOR THE FILTRATION OF PARTICLES CONTAINED IN EXHAUST GASES FROM AN INTERNAL COMBUSTION ENGINE

BACKGROUND OF THE INVENTION

1. Field of the Invention

The invention relates to a body formed by assembling a plurality of units and used in particular to filter particles contained in the exhaust gases of an internal combustion engine, in particular of the diesel type.

Conventionally, before being exhausted to the atmosphere, exhaust gases may be purified by means of a particle filter such as the prior art filter shown in FIGS. 1 and 2.

FIG. 1 shows a particle filter 1 in cross section taken along the line B-B in FIG. 2 and FIG. 2 shows the particle filter 1 in longitudinal section taken along the line A-A in FIG. 1.

2. Description of the Related Art

The particle filter 1 conventionally includes at least one filter body 3 inserted into a metal enclosure 5. The filter body 3 is produced by assembling and machining a plurality of units 11, referenced 11a-11i, produced by extruding a ceramic material (cordierite, silicon carbide, etc.) to form porous honeycomb structures.

Before assembly and machining, a unit 11 (see FIG. 3) conventionally has the shape of a rectangular parallelepiped extending along an axis D-D between a substantially square upstream face 12 and a substantially square downstream face 13 onto which a plurality of rectilinear square section passages 14 parallel to the axis D-D discharge.

The exterior faces 15 of the passages 13p located at the periphery of the unit 11, referred to as "peripheral passages", form an exterior surface 16 of the unit 11 (see FIG. 3). Because of the substantially square cross section of the unit 11, the exterior surface 16 has four faces 16a-16d, pairs of which are mutually perpendicular.

After extrusion, the units 11 are alternately blocked at the upstream face (outlet passages 14s) or the downstream face (inlet passages 14e). This is known in the art.

The units 11a-11i are then assembled by bonding them together by means of ceramic cement joints 17 generally consisting of silica and/or silicon carbide and/or aluminum nitride. The resulting assembly can then be machined to a round section, for example. This produces a cylindrical filter body 3 with axis C-C which can be inserted into the enclosure 5, a peripheral seal 18 that is impermeable to the exhaust gases being disposed between the exterior filter units 11a-11h and the enclosure 5.

As shown by the arrows in FIG. 2, the flow F of exhaust gases enters the filter body 3 via the inlet passages 14e, passes through the filter walls 20 of those passages into the outlet passages 14s, and is then exhausted to the exterior.

After a certain time of use the performance of the engine is degraded by particles or "soot" accumulated in the inlet passages 14e of the filter body 3. For this reason, the filter body 3 must be regenerated regularly, for example every 500 kilometers. Regeneration or "unclogging" consists in oxidizing the soot by heating it to a temperature at which it can ignite.

During regeneration phases, the exhaust gases carry in the downstream direction all the heat energy given off by the combustion of the soot. Moreover, because the soot is not deposited uniformly in the various passages, the combustion areas are not uniformly distributed in the filter body 3. Finally, the peripheral areas of the filter body 3 are cooled by the surrounding air through the metal enclosure 5.

As a result of this the temperature differs in the various areas of the filter body 3 and does not vary uniformly. The non-homogeneous temperatures in the filter body 3 and the different kinds of materials used for the filter units 11a-11i, on the one hand, and the joints 17, on the other hand, generate high local stresses that can cause local breaks or cracks. In particular, the local stresses at the interfaces between the units 11a-11h and the enclosure 5 and between the units 11a-11i and the joints 17 may lead to the units 11a-11i becoming unstuck, thereby reducing the service life of the particle filter 1.

SUMMARY OF THE INVENTION

The object of the invention is to provide a new filter body adapted to reduce this risk of unsticking.

That object is achieved by a filter body intended in particular for filtering particles contained in the exhaust gases of an internal combustion engine, said filter body being formed by bonding filter units by means of a joint, noteworthy in that an exterior surface of a first of said units face to face with a second of said units and in contact with said joint includes at least one irregularity of the boss and/or recess type.

As will emerge in more detail in the remainder of the description, the presence of irregularities on the exterior surface of a unit encourages the adhesion of the joints 17 and therefore limits the risk of unsticking in the event of high thermomechanical stresses.

According to preferred other features of the invention:

said irregularity extends along the longitudinal axis of said unit over the whole length of said first unit, which advantageously allows it to be formed during extrusion;

said irregularity is a recess carried by an exterior face of a gas outlet passage at the periphery of said first unit;

said irregularity is a recess in the thickness of an exterior wall of a passage at the periphery of said first filter unit, which advantageously reduces the quantity of material necessary for fabricating the unit;

said irregularity is a boss carried by an exterior face of a gas inlet passage at the periphery of said first filter unit, which advantageously increases the interior volume of the inlet passages and therefore their soot storage capacity;

the width of said irregularity measured in a transverse plane of said first unit is substantially equal to the width of said exterior face of said passage;

said exterior surface includes a plurality of said irregularities regularly spaced from each other;

at least one portion of said exterior surface of said first unit has a sinusoidal shape in cross section;

said irregularity is conformed so that it can be accommodated in an irregularity of complementary shape of said second unit;

said irregularity is a recess in the thickness of an exterior wall of a passage at the periphery of said first unit.

BRIEF DESCRIPTION OF THE DRAWING FIGURES

The following description, which is given with reference to the appended drawings, explains and assesses the advantages of the invention. In the drawings.

DETAILED DESCRIPTION OF THE PREFERRED EMBODIMENTS

In the nonlimiting figures, the various items are not necessarily represented to the same scale. The same references are used in the various figures to designate identical or similar items.

Figure 1:
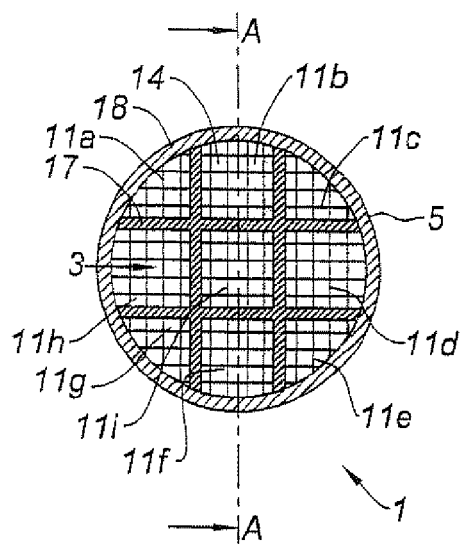
FIG. 1 represents a prior art particle filter in cross section taken along the line B-B in FIG. 2.
Figure 2:
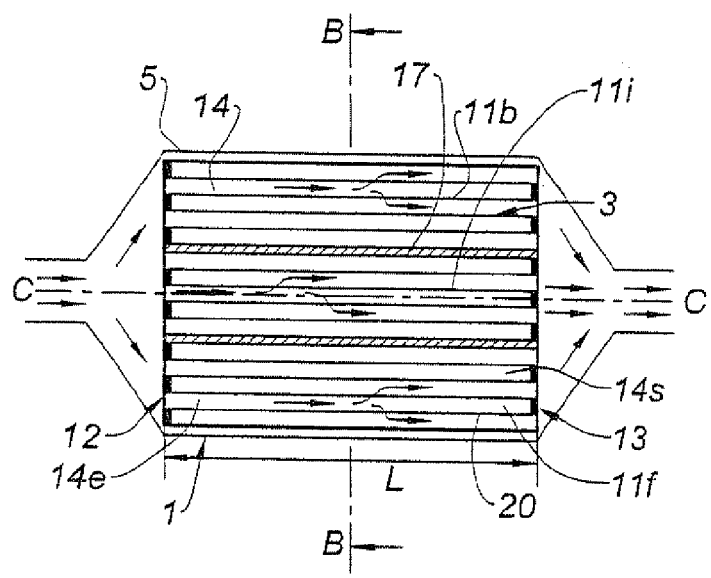
FIG. 2 represents the same particle filter in longitudinal section taken along the line A-A in FIG. 1.
Figure 3:
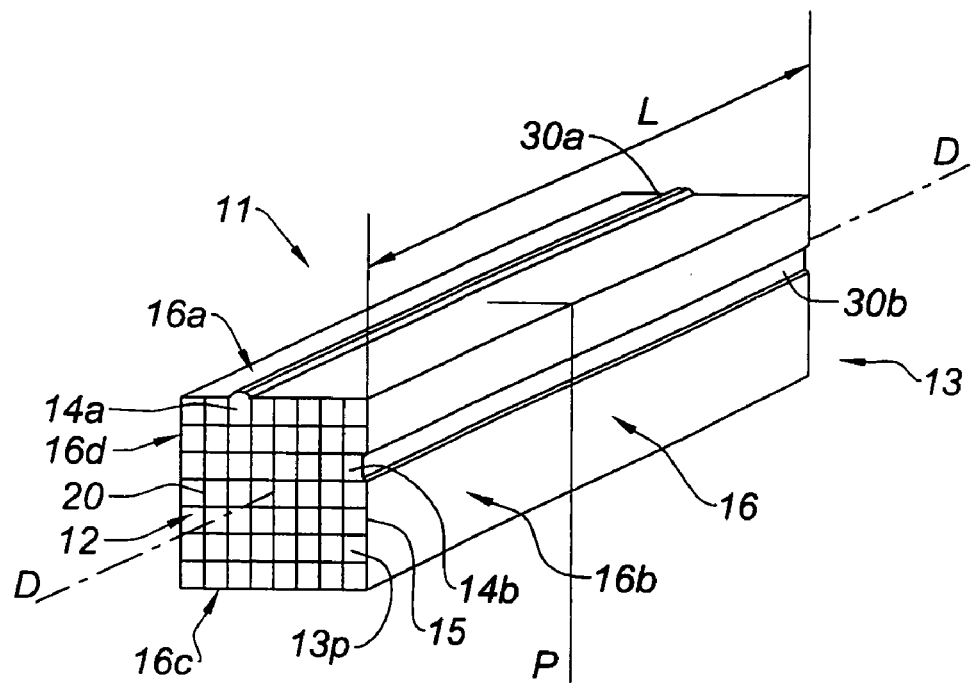
FIG. 3 is a perspective view of a unit that can be used to fabricate a filter body of the invention.

FIGS. 1 and 2 have been described in the preamble. Refer to FIG. 3, also described in part hereinabove.

According to the invention, the first and second faces 16a and 16b of the exterior surface 16 of the filter unit 11 include first and second irregularities 30a and 30b, respectively, that extend along the longitudinal axis D-D of the unit 11. The irregularities 30a and 30b preferably have a length "L" equal to that of the unit 11 and extend from the upstream face 12 to the downstream face 13 on exterior faces 32a and 32b of peripheral passages 14a and 14b, respectively.

Figure 4:
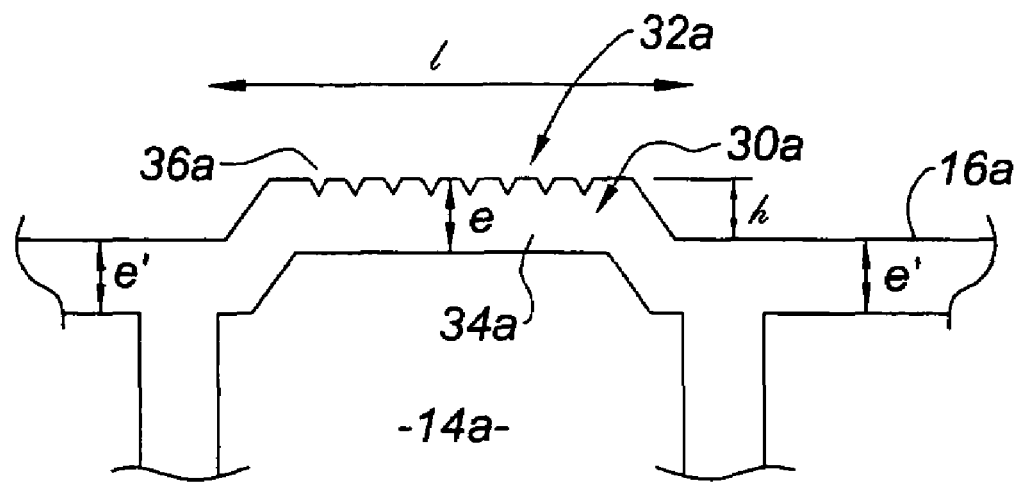
FIGS. 4 and 5 represent details of the unit represented in FIG. 3 in cross section in the plane P shown in FIG. 3.
Figure 5:
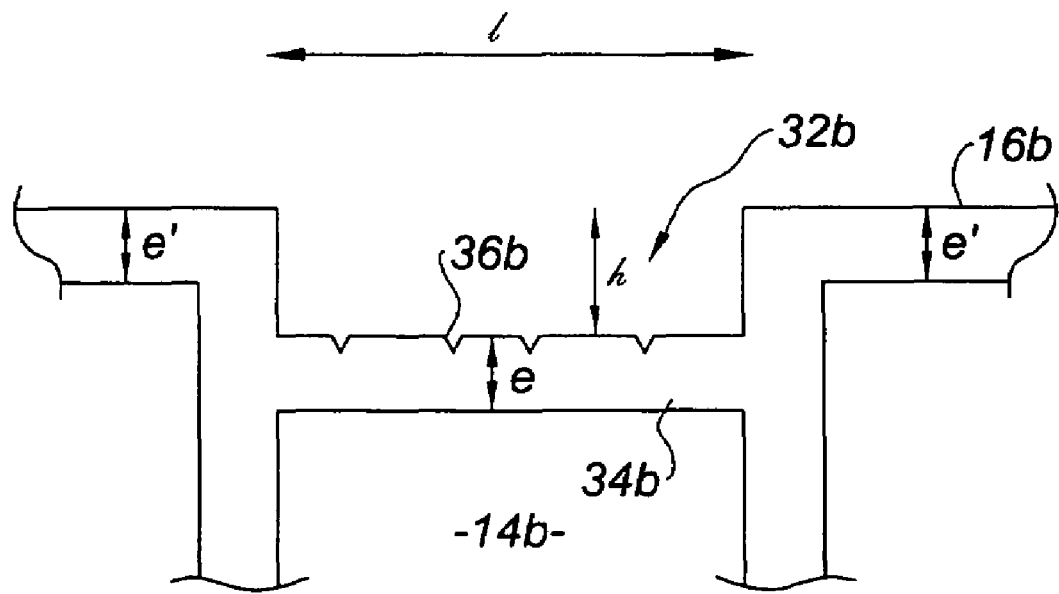

The irregularities 30a and 30b, represented in section in FIGS. 4 and 5, respectively, are respectively a boss and a groove. The width "I" of these irregularities is substantially that of the exterior faces 32a and 32b of the peripheral passages 14a and 14b, respectively. The irregularities 30a and 30b are in line with a single passage 14a and 14b, respectively.

The irregularities 30a and 30b can have any height "h". The height "h" is preferably less than the local thickness of the exterior walls 34a and 34b of the peripheral passages 30a and 30b on the exterior faces 32a and 32b whereof the irregularities 30a and 30b, respectively, extend.

The thickness "e" of the exterior walls of the peripheral passages forming the boss 30a and/or the groove 30b is preferably substantially constant and substantially equal to the thickness "e'" of the exterior walls of the adjacent peripheral passages.

The thickness "e" is preferably never zero; in other words, the irregularity does not create a lateral opening in the peripheral passage(s) in which it is formed.

The boss 30a then takes the form of an outward deformation of the exterior wall 34a of the passage 14a (FIG. 4). This advantageously increases the useful interior volume of the passage 14a.

After each regeneration, ash accumulates in the inlet passages, which limits their subsequent efficiency and limits the time of use of the filter unit before the next regeneration. To extend the service life of the filter, it is preferable for the passage 14a to be an inlet passage, i.e. a passage through which the gases to be filtered are introduced into the filter unit 11.

The groove 30b preferably extends over an outlet passage 14b (FIG. 5). This has the advantage of avoiding the loss of volume of an inlet passage.

Moreover, the reduction of the volume of a peripheral outlet passage adapts it to the reduced volumes of filtered gas that it receives. Indeed, a peripheral outlet passage does not receive filtered gases through its face(s) in contact with the joints 17 and therefore receives a lesser volume of gas than passages inside the filter unit, or "interior passages", the four faces of which have a filter action. The groove 30b represented in FIG. 5 reduces the section of the peripheral outlet passage 14b and advantageously makes the ratios between the section of a passage and the volume of gas that it receives homogeneous between the various outlet passages. This facilitates the flow of gas through the filter unit and reduces the head loss.

To improve further the adhesion of the joint 17 to the exterior face 16 of the unit 11, the exterior surfaces of the boss 30a and/or the groove 30b may themselves have microroughnesses 36a and 36b, respectively.

Figure 6:
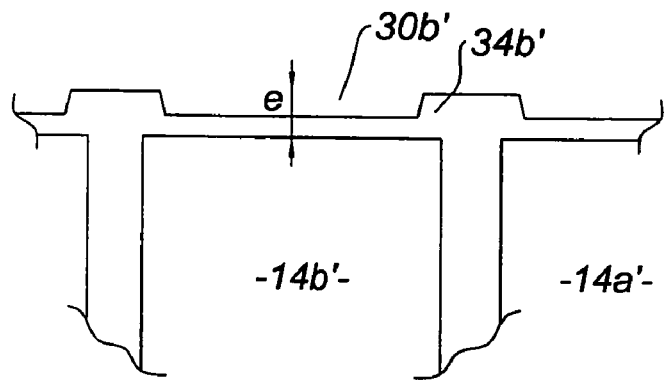
FIGS. 6 and 7 represent in cross section details of different variants of units of the invention.

As represented in FIG. 6, a groove 30b' may result from a local reduction in the thickness "e" of an exterior wall 34b' of a passage 14b'. This advantageously reduces the quantity of material necessary for fabricating the filter unit 11. Furthermore, this embodiment enables grooves to be produced on the inlet passages 14a' without reducing their interior volume.

There is no limit on the number of irregularities 30a and 30b. In one embodiment of the invention, bosses 30a and grooves 30b follow on alternately over the width of at least one face 16a-16d of the exterior surface 16 of the unit 11, preferably covering respective successive inlet and outlet passages. The longitudinal grooves 30b and bosses 30a are preferably regularly spaced from each other.

Figure 7:
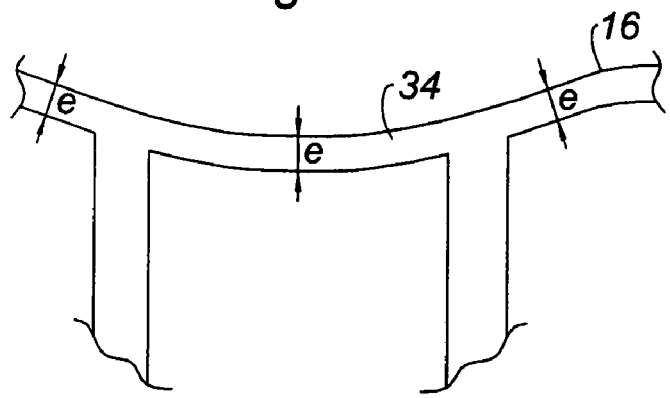

The transition between bosses and grooves may be progressive, with no projecting corners. For example, the exterior surface 16 of the unit may have a sinusoidal shape in cross section, at least locally, as represented in FIG. 7. The thickness "e" of the exterior walls 34 of the peripheral passages is preferably substantially constant.

The boss 30a or the grooves 30b may also straddle two passages, which is preferable because it reinforces the mechanical coherence of the unit 11.

The shape, dimensions and number of the irregularities 30a and 30b are preferably determined as a function of the support, i.e. the joints 17 for fastening them together. The shape, dimensions and number of the irregularities 30a and 30b may in particular depend on the nature and/or the thickness of the joints 17, the position of the irregularities on the exterior surface 16 of the unit 11 and/or the position of the unit 11 within the filter body 3. Thus not all the faces 16a-16d of the same filter unit 11 are necessarily provided with the same irregularities.

However, the width "I" of the irregularities is preferably less than or equal to that of the passages over which they extend, preferably substantially equal thereto.

Neither the width "I", nor the length "L", nor the thickness "e", nor the orientation of an irregularity is limiting on the invention. For example, according to the invention, the exterior surface 16 of the filter unit 11 can have diagonal striations in one or more directions, holes, notches, etc. The width, thickness or orientation may also vary along the same irregularity.

In a variant of the invention that is not represented, two units intended to be assembled with two respective faces placed once against the other have irregularities on said faces that have complementary shapes and are disposed so that they can be accommodated one within the other.

The irregularities extending longitudinally may be fabricated during extrusion of the unit 11 by means of an appropriate die, using techniques known to the person skilled in the art. It is equally possible to form the irregularities on the surface of the unit 11 solid by "sculpting" the exterior surface 16 of the unit 11 and/or by fixing beads 30a of material thereto by gluing, welding or any other technique known in the art. The material of the attached beads 30a may be the same as or different from the material of the unit 11.

Of course, the present invention is not limited to the embodiments described hereinabove and represented by way of illustrative and nonlimiting example.

The joint 17 disposed between the respective exterior faces of two units facing each other may be continuous or discontinuous, provided that they fasten the units together.

The filter unit 11 can have any shape.

The cross section of the passages 14 is not limited to a square shape. Equally, the section of the inlet passages could be different from that of the outlet passages. The cross section of a passage could also evolve along the passage, periodically or otherwise.

The invention claimed is:

1. A filter body formed by bonding porous ceramic honeycomb filter units by means of a joint (17), said filter units comprising passages which are alternately blocked at the upstream face to form outlet passages or at the downstream face to form inlet passages,
   wherein an exterior surface (16) of a first of said units (11) face to face with a second of said units and in contact with said joint (17) includes at least one irregularity (30a, 30b) of a boss and/or recess type.

2. The filter body according to claim 1, wherein said at least one irregularity (30a, 30b) extends along a longitudinal axis (D-D) of said first unit (11) over a whole length of said first unit (11).

3. The filter body according to claim 1, wherein said at least one irregularity (30a, 30b) is a recess (30b) carried by an exterior face (32b) of a gas outlet passage (14b) at a periphery of said first unit (11).

4. The filter body according to claim 1, wherein said at least one irregularity (30a, 30b) is a boss (30a) carried by an exterior face (32a) of a gas inlet passage (14a) at a periphery of said first unit (11).

5. The filter body according to claim 3, wherein a width (1) of said at least one irregularity (30a, 30b) measured in a transverse plane (P) of said first unit (11) is substantially equal to a width of said exterior face of said passage.

6. The filter body according to claim 1, wherein said exterior surface (16) includes a plurality of said irregularities (30a, 30b) regularly spaced from each other.

7. The filter body according to claim 1, wherein at least one portion of said exterior surface (16) of said first unit (11) has a sinusoidal shape in cross section.

8. The filter body according to claim 1, wherein said at least one irregularity (30a, 30b) is conformed so that it can be accommodated in an irregularity (30a, 30b) of complementary shape of said second unit.

9. The filter body according to claim 1, wherein said at least one irregularity (30a, 30b) is a recess (30b') formed in a thickness of an exterior wall (34b') of a passage (14b') at a periphery of said first unit (11).

10. The filter body according to claim 2, wherein said at least one irregularity (30a, 30b) is a recess (30b) carried by an exterior face (32b) of a gas outlet passage (14b) at a periphery of said first unit (11).

11. The filter body according to claim 2, wherein said at least one irregularity (30a, 30b) is a boss (30a) carried by an exterior face (32a) of a gas inlet passage (14a) at a periphery of said first unit (11).

12. The filter body according to claim 4, wherein a width (1) of said at least one irregularity (30a, 30b) measured in a transverse plane (P) of said first unit (11) is substantially equal to a width of said exterior face of said passage.

13. A filter body formed by bonding filter units by means of a joint (17), an exterior surface (16) of a first of said filter units (11) face to face with a second of said filter units and in contact with said joint (17) including at least one recess (30b) carried by an exterior face (32b) of a gas outlet passage 14(b) at a periphery of said first unit (11).

14. A filter body formed by bonding filter units by means of a joint (17), an exterior surface (16) of a first of said filter units (11) face to face with a second of said filter units and in contact with said joint (17) including at least a boss (30a) carried by an exterior face (32a) of a gas inlet passage (14a) at a periphery of said first unit (11).

15. The filter body according to claim 14, wherein a width (1) of an irregularity (30a, 30b) measured in a transverse plane (P) of said first unit (11) is substantially equal to a width of said exterior face of said passage.

16. A filter body formed by bonding filter units by means of a joint (17), an exterior surface (16) of a first of said filter units (11) face to face with a second of said filter units and in contact with said joint (17) including at least one irregularity (30a, 30b) of a boss and/or recess type, wherein at least one portion of said exterior surface (16) of said first unit (11) has a sinusoidal shape in cross section.

17. A filter body formed by bonding filter units by means of a joint (17), an exterior surface (16) of a first of said filter units (11) face to face with a second of said filter units and in contact with said joint (17) including at least one recess (30b') formed in a thickness of an exterior wall (34b') of a passage (14b') at a periphery of said first filter unit (11).

18. A filter body formed by bonding filter units by means of a joint (17), an exterior surface (16) of a first of said filter units (11) face to face with a second of said filter units and in contact with said joint (17) including at least one irregularity (30a, 30b) of a boss and/or recess type, said irregularity (30a, 30b) extending along a longitudinal axis (D-D) of said first filter unit (11) over a whole length of said first filter unit (11), wherein said irregularity (30a, 30b) is a recess (30b) carried by an exterior face (32b) of a gas outlet passage (14b) at a periphery of said first unit (11).

19. The filter body according to claim 18, wherein a width of said irregularity (30a, 30b) measured in a transverse plane (P) of said first unit (11) is substantially equal to the width of said exterior face of said passage.

* * * * *